(12) United States Patent
Rubio

(10) Patent No.: US 12,364,359 B2
(45) Date of Patent: Jul. 22, 2025

(54) COOKING DEVICE COMPRISING A MULTI-LAYER DIFFUSER BASE

(71) Applicant: SEB S.A., Ecully (FR)

(72) Inventor: Martin Rubio, Rumilly (FR)

(73) Assignee: SEB S.A. (FR)

( * ) Notice: Subject to any disclaimer, the term of this patent is extended or adjusted under 35 U.S.C. 154(b) by 402 days.

(21) Appl. No.: 17/783,781

(22) PCT Filed: Dec. 8, 2020

(86) PCT No.: PCT/EP2020/085135
§ 371 (c)(1),
(2) Date: Jun. 9, 2022

(87) PCT Pub. No.: WO2021/116127
PCT Pub. Date: Jun. 17, 2021

(65) Prior Publication Data
US 2023/0008372 A1    Jan. 12, 2023

(30) Foreign Application Priority Data
Dec. 10, 2019 (FR) ...................................... 1914099

(51) Int. Cl.
*A47J 36/02* (2006.01)
*A47J 37/10* (2006.01)

(52) U.S. Cl.
CPC ............... *A47J 36/02* (2013.01); *A47J 37/10* (2013.01)

(58) Field of Classification Search
None
See application file for complete search history.

(56) References Cited

U.S. PATENT DOCUMENTS

| 4,541,411 A * | 9/1985 | Woolf ...................... A47J 36/02 |
| | | 220/573.2 |
| 7,906,221 B2 * | 3/2011 | Groll ...................... B32B 15/012 |
| | | 220/573.1 |
| 2011/0041708 A1 | 2/2011 | Groll | |

FOREIGN PATENT DOCUMENTS

| FR | 3070245 A1 | 3/2019 |
| WO | 2018151716 A1 | 8/2018 |

OTHER PUBLICATIONS

International Search Report for PCT Application No. PCT/EP2020/085135 dated Dec. 14, 2020, 3 pgs.

\* cited by examiner

*Primary Examiner* — Daniel J. Schleis
(74) *Attorney, Agent, or Firm* — Lerner David LLP

(57) ABSTRACT

A cooking device includes a cooking support having a cooking face and a heating face, an aluminum layer being metallurgically assembled with the heating face, an anisotropic graphite layer being encapsulated between the aluminum layer and another aluminum layer.

The aluminum layer may be metallurgically assembled with the heating face leaving a portion of the heating face free around the aluminum layer, the aluminum layer and the anisotropic graphite layer being part of a multilayer diffuser bottom.

21 Claims, 3 Drawing Sheets

[Fig. 1]
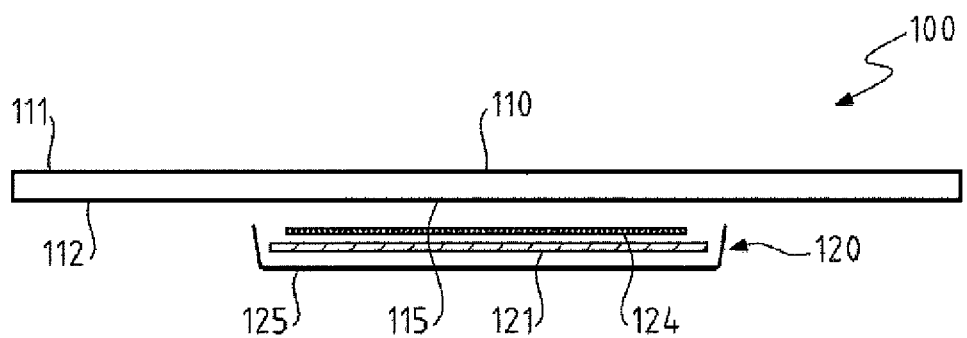
[Fig. 2]
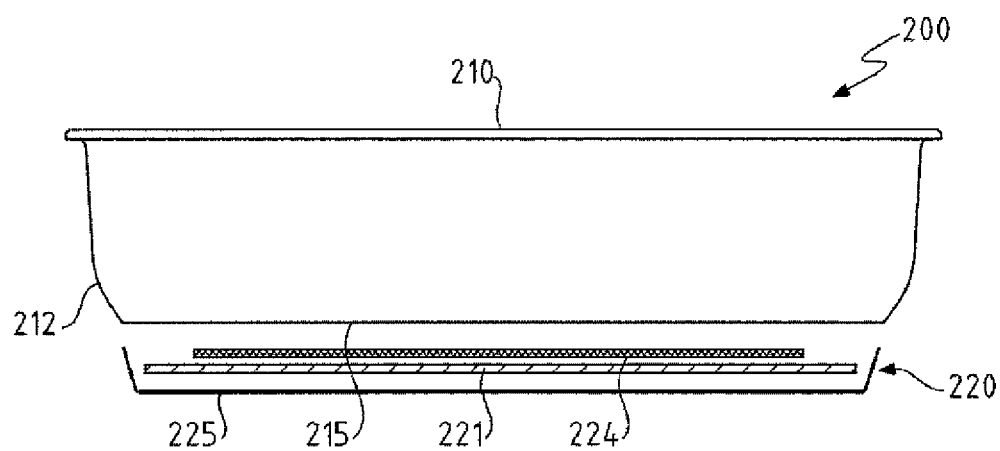
[Fig. 3]
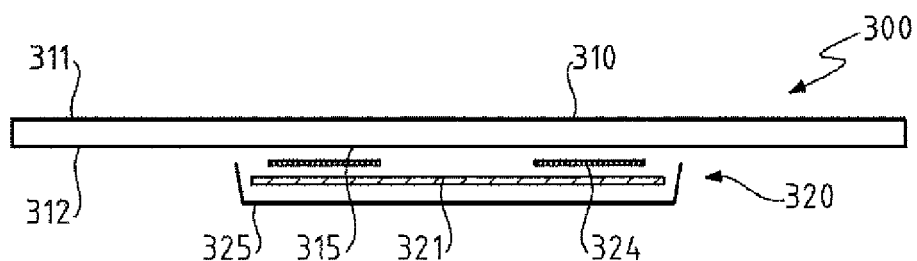

[Fig. 4]
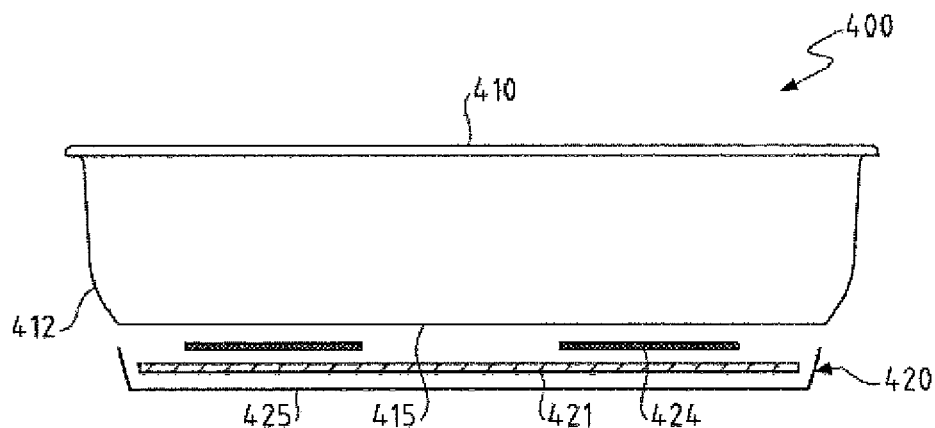
[Fig. 5]
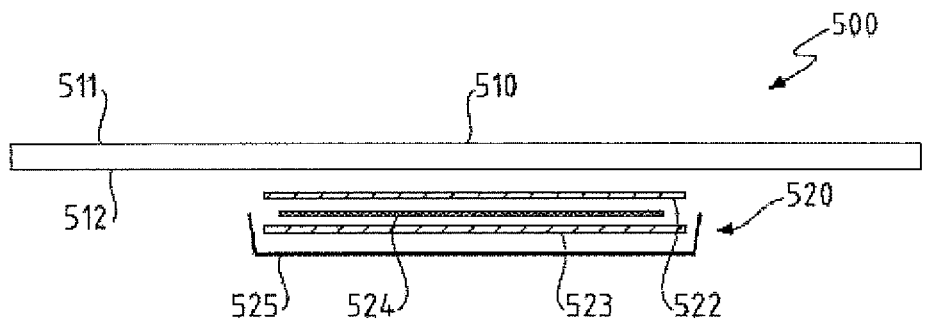
[Fig. 6]
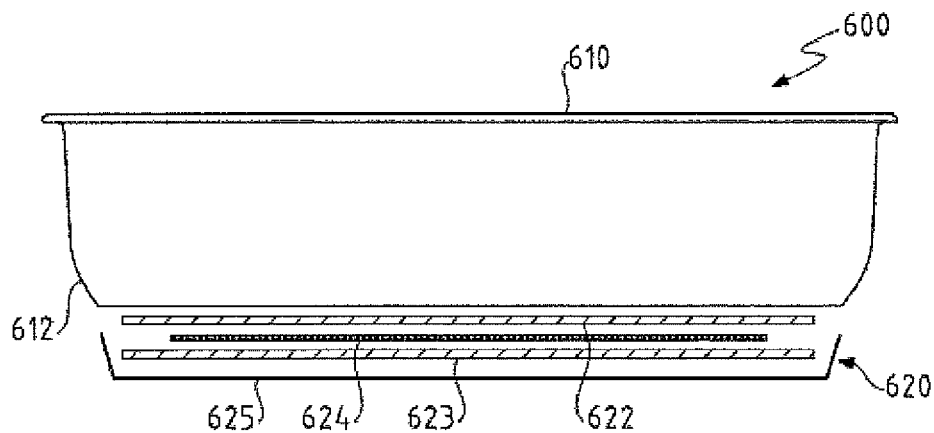

[Fig. 7]
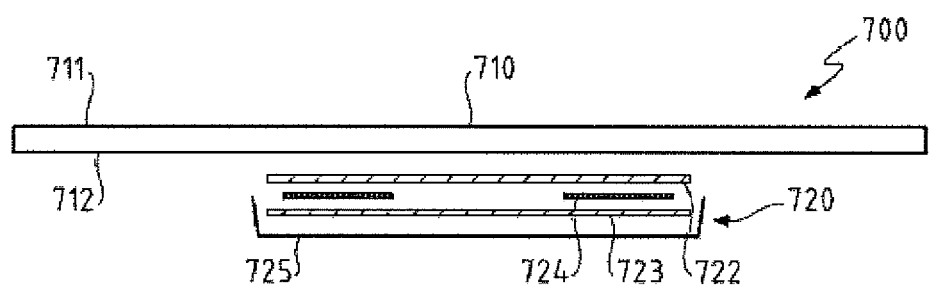
[Fig. 8]
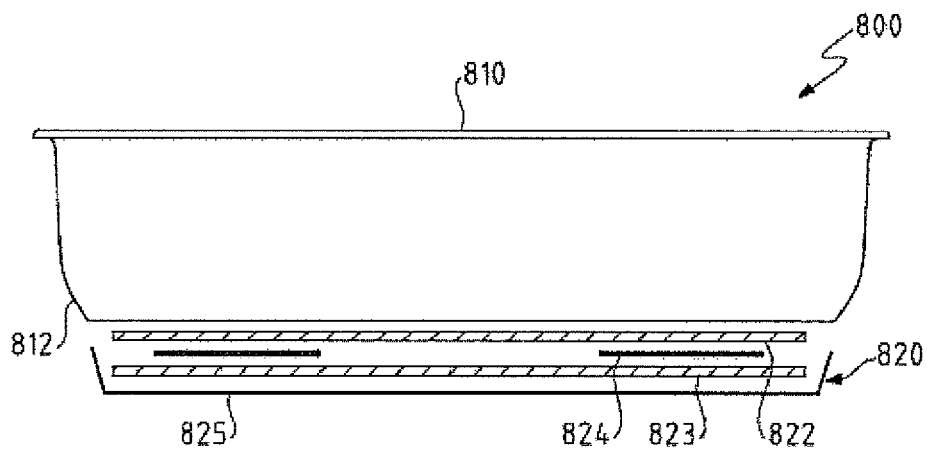

COOKING DEVICE COMPRISING A MULTI-LAYER DIFFUSER BASE

CROSS-REFERENCE TO RELATED APPLICATIONS

The present application is a national phase entry under 35 U.S.C. § 371 of International Application No. PCT/EP2020/085135 filed Dec. 8, 2020, which claims priority from French Application No. 1914099 filed on Dec. 10, 2019, all of which are incorporated herein by reference.

The present invention relates to the technical field of cooking devices comprising a multilayer diffuser bottom intended to be placed on a heating source.

The present invention relates in particular to culinary items such as frying pans, saucepans, skillets, stewpots, pressure cooker pots, griddles, intended for use on an electric heat source and/or on a combustion heat source.

The present invention also relates to a cooking vessel or a cooking support that is part of a heating appliance comprising a heat source on which said cooking vessel or cooking support can be placed.

It is known to produce a cooking device comprising a cooking support having a cooking face and a heating face, as well as a diffuser bottom comprising an aluminum layer metallurgically assembled with the heating face. The good thermal conductivity of the aluminum allows the heat transmitted by the heat source to be dispersed in the diffuser bottom, which helps to improve the heating homogeneity of the cooking support.

A disadvantage of such an embodiment is that a thick layer of aluminum may be required to achieve satisfactory temperature homogeneity and/or avoid hot spots likely to cause the food placed on the cooking support to burn.

Document U.S. Pat. No. 4,541,411 discloses a cooking device comprising a layer of anisotropic graphite encapsulated between two other layers that may be made of aluminum. However, this cooking device has a side wall formed by these two other layers assembled together.

One purpose of the invention is to propose a cooking device in which the heating homogeneity of the heating face can be improved, without requiring a substantial increase in the mass and/or thickness of the cooking device.

Another purpose of the invention is to propose a cooking device in which the maximum temperature reached on the heating face can be improved, without requiring a substantial increase in the mass and/or thickness of the cooking device.

Another purpose of the invention is to propose a method of obtaining a cooking device in which the heating homogeneity of the heating face can be improved, without requiring a substantial increase in the mass and/or thickness of the cooking device.

Another purpose of the invention is to propose a method of obtaining a cooking device in which the maximum temperature reached on the heating face can be better controlled, without requiring a substantial increase in the mass and/or thickness of the cooking device.

These goals are achieved with a cooking device comprising a cooking support having a cooking face and a heating face, an aluminum layer being metallurgically assembled with the heating face, an anisotropic graphite layer being encapsulated between the aluminum layer and another aluminum layer, due to the fact that the aluminum layer is metallurgically assembled with the heating face leaving a portion of the heating face free around the aluminum layer, the aluminum layer and the anisotropic graphite layer being part of a multilayer diffuser bottom.

These goals are also achieved with a cooking device comprising a cooking support having a cooking face and a heating face, and a multilayer diffuser bottom comprising an aluminum layer being metallurgically assembled with the heating face leaving a portion of the heating face free around the aluminum layer, due to the fact that the multilayer diffuser bottom comprises an anisotropic graphite layer encapsulated between the aluminum layer and another aluminum layer.

In other words, the aluminum layer is metallurgically assembled with the other aluminum layer around the anisotropic graphite layer. These arrangements promote good thermal diffusion transversely to the heating face, which helps to minimize the hot spots and also to avoid temperature differences on the cooking face above the multilayer diffuser bottom. The appearance of burning phenomena can thus be delayed.

According to one embodiment, the anisotropic graphite layer is adjacent to the heating face, and the other aluminum layer is part of the heating face. Thus, the anisotropic graphite layer is encapsulated between the aluminum layer that is part of the multilayer diffuser bottom and the heating face that is part of the cooking support. This arrangement reduces the mass of the cooking device while ensuring good thermal homogeneity of the heating face.

According to another embodiment, the aluminum layer is arranged between the heating face and the anisotropic graphite layer. Thus, the anisotropic graphite layer is encapsulated between the other aluminum layer that is part of the multilayer diffuser bottom and the aluminum layer that is part of the multilayer diffuser bottom. This arrangement makes it possible to consider other materials than aluminum for the cooking support, for example steel, in particular stainless steel.

The other aluminum layer can then be part of the multilayer diffuser bottom.

The anisotropic graphite layer can be arranged between the aluminum layer and the other aluminum layer.

The heating face can be made of stainless steel. In particular, the cooking support can be made of stainless steel or of a colaminate material with a stainless-steel outer layer.

According to one embodiment, the anisotropic graphite layer is annular. This arrangement improves the mechanical strength of the multilayer diffuser bottom assembly, minimizing the impact on thermal homogeneity and the hot spots, as heat diffusion issues are less pronounced in the center of the multilayer diffuser bottom.

The anisotropic graphite layer may comprise at least one perforation. This arrangement improves the mechanical strength of the multilayer diffuser bottom assembly by allowing the aluminum layer to be bonded to the cooking support or to the other aluminum layer through the perforation or perforations.

Alternatively, the anisotropic graphite layer may be free of perforations.

The multilayer diffuser bottom may comprise an outer layer made of ferritic stainless steel. The outer layer made of ferritic stainless steel makes it possible to obtain a cooking device that can be heated by induction.

The outer layer may form a cup with an annular edge coming into contact with the heating face. This arrangement allows the aluminum portions of the multilayer diffuser bottom to be concealed.

These goals are also achieved with a method of obtaining a cooking device comprising the following steps:

Providing and/or obtaining an anisotropic graphite layer, an aluminum layer capable of covering the anisotropic graphite layer, and a cooking support comprising a heating face having another aluminum layer capable of covering the aluminum layer;

Stacking the aluminum layer, the anisotropic graphite layer and the cooking support, or inversely, the anisotropic graphite layer leaving an annular portion of the aluminum layer free, the heating face extending around the aluminum layer;

Metallurgically assembling, by hot stamping or solid state bonding, the aluminum heating face with the aluminum layer around the anisotropic graphite layer.

The method may comprise a step of shaping the cooking support to obtain a cooking vessel.

This cooking support shaping step may be a preliminary step before metallurgical assembly, or a subsequent step after metallurgical assembly.

In particular, the cooking support shaping step may be carried out by stamping or flow-forming.

The anisotropic graphite layer and the aluminum layer may be part of a multilayer diffuser bottom.

These goals are also achieved with a method of obtaining a cooking device comprising the following steps:

Providing and/or obtaining an anisotropic graphite layer, an aluminum layer capable of covering the anisotropic graphite layer, another aluminum layer capable of covering the anisotropic graphite layer, and a cooking support comprising a heating face capable of covering the aluminum layer;

Stacking the other aluminum layer, the anisotropic graphite layer, the aluminum layer, and the cooking support, or inversely, the anisotropic graphite layer leaving an annular portion of the aluminum layer free, the anisotropic graphite layer leaving another annular portion of the other aluminum layer free, the annular portion of the aluminum layer extending annularly with respect to the other annular portion of the other aluminum layer, the heating face extending around the aluminum layer;

Metallurgically assembling, by hot stamping or solid state bonding, the aluminum layer on the one hand with the heating face and on the other hand with the aluminum layer around the anisotropic graphite layer.

The method may comprise a step of shaping the cooking support to obtain a cooking vessel.

This cooking support shaping step may be a preliminary step before metallurgical assembly, or a subsequent step after metallurgical assembly.

In particular, the cooking support shaping step may be carried out by stamping or flow-forming.

The anisotropic graphite layer, the aluminum layer, and the other aluminum layer may be part of a multilayer diffuser bottom.

The invention will be better understood from the study of eight exemplary embodiments, taken without any limitation, illustrated in the attached figures, in which:

FIG. 1 is a schematic view of the elements of a first exemplary embodiment of a cooking device before their assembly, this cooking device comprising a cooking support and a multilayer diffuser bottom comprising an aluminum layer and an anisotropic graphite layer, FIG. 2 is a schematic view of the elements of a second exemplary embodiment of a cooking device before their assembly, this cooking device comprising a cooking support and a multilayer diffuser bottom comprising an aluminum layer and an anisotropic graphite layer, wherein the cooking support is a cooking vessel, FIG. 3 is a schematic view of the elements of a third exemplary embodiment of a cooking device before their assembly, this cooking device comprising a cooking support and a multilayer diffuser bottom comprising an aluminum layer and an annular anisotropic graphite layer, FIG. 4 is a schematic view of the elements of a fourth exemplary embodiment of a cooking device before their assembly, this cooking device comprising a cooking support and a multilayer diffuser bottom comprising an aluminum layer and an annular anisotropic graphite layer, wherein the cooking support is a cooking vessel, FIG. 5 is a schematic view of the elements of a fifth exemplary embodiment of a cooking device before their assembly, this cooking device comprising a multilayer diffuser bottom comprising an aluminum layer, another aluminum layer and an anisotropic graphite layer, FIG. 6 is a schematic view of the elements of a sixth exemplary embodiment of a cooking device before their assembly, this cooking device comprising a multilayer diffuser bottom comprising an aluminum layer, another aluminum layer, and an anisotropic graphite layer, wherein the cooking support is a cooking vessel, FIG. 7 is a schematic view of the elements of a seventh exemplary embodiment of a cooking device before their assembly, this cooking device comprising a multilayer diffuser bottom comprising an aluminum layer, another aluminum layer and an annular anisotropic graphite layer, FIG. 8 is a schematic view of the elements of an eighth exemplary embodiment of a cooking device before their assembly, this cooking device comprising a multilayer diffuser bottom comprising an aluminum layer, another aluminum layer and an annular anisotropic graphite layer, wherein the cooking support is a cooking vessel.

The cooking devices 100, 200, 300, 400, 500, 600, 700, 800 illustrated in FIGS. 1 to 8 comprise a cooking support 110, 210, 310, 410, 510, 610, 710, 810 and a multilayer diffuser bottom 120, 220, 320, 420, 520, 620, 720, 820. FIGS. 1 to 8 illustrate the elements of the cooking support 110, 210, 310, 410, 510, 610, 710, 810 and of the multilayer diffuser bottom 120, 220, 320, 420, 520, 620, 720, 820 before assembly.

The cooking support 110; 210; 310; 410; 510; 610; 710; 810 has a cooking face 111; 311; 511; 711 and a heating face 112; 212; 312; 412; 512; 612; 712; 812. The cooking support 110, 210, 310, 410, 510, 610, 710, 810 may be flat, as shown in FIGS. 1, 3, 5 and 7, or form a cooking vessel comprising the heating face 212; 412; 612; 812, as shown in FIGS. 2, 4, 6 and 8.

The multilayer diffuser bottom 120; 220; 320; 420; 520; 620; 720; 820 comprises an aluminum layer 121; 221; 321; 421; 522; 622; 722; 822 and an anisotropic graphite layer 124; 224; 324; 424; 524; 624; 724; 824. If desired, the multilayer diffuser bottom 120; 220; 320; 420; 520; 620; 720; 820 may comprise an outer layer 125; 225; 325; 425; 525; 625; 725; 825 arranged opposite the cooking support 110, 210, 310, 410, 510, 610, 710, 810. The outer layer 125; 225; 325; 425; 525; 625; 725; 825 may in particular be made of ferritic stainless steel. If desired, the outer layer 125; 225; 325; 425; 525; 625; 725; 825 may form a cup having an annular edge coming into contact with the heating face 112; 212; 312; 412; 512; 612; 712; 812. As can be clearly seen in FIGS. 1 to 8, the aluminum layer 121; 221; 321; 421; 522; 622; 722; 822 is flat. As can be clearly seen in FIGS. 1 to 8, the anisotropic graphite layer 124; 224; 324; 424; 524; 624; 724; 824 is flat.

The aluminum layer 121; 221; 321; 421; 522; 622; 722; 822 is metallurgically assembled with the heating face 112;

212; 312; 412; 512; 612; 712; 812 leaving a portion of the heating face 112; 212; 312; 412; 512; 612; 712; 812 free around the aluminum layer 121; 221; 321; 421; 522; 622; 722; 822. If desired, the aluminum layer 121; 221; 321; 421; 522; 622; 722; 822 may be a disc.

The anisotropic graphite layer 124; 224; 324; 424; 524; 624; 724; 824 is encapsulated between the aluminum layer 121; 221; 321; 421; 522; 622; 722; 822 and another aluminum layer 115; 215; 315; 415; 523; 623; 723; 823.

In the exemplary embodiments illustrated in FIGS. 1 to 4, the anisotropic graphite layer 124; 224; 324; 424 is adjacent to the heating face 112; 212; 312; 412, and the other aluminum layer 115; 215; 315; 415 is part of the heating face 112; 212; 312; 412. The cooking support 110; 210; 310; 410 may be made of aluminum, thus forming the other aluminum layer 115; 215; 315; 415. The cooking support 110; 210; 310; 410 may also be made of a colaminate material comprising the other aluminum layer 115; 215; 315; 415.

In the exemplary embodiments illustrated in FIGS. 5 to 8, the aluminum layer 522; 622; 722; 822 is arranged between the heating face 512; 612; 712; 812 and the anisotropic graphite layer 524; 624; 724; 824. If desired, the heating face 512; 612; 712; 812 may then be made of stainless steel. The anisotropic graphite layer 524; 624; 724; 824 is arranged between the aluminum layer 522; 622; 722; 822 and the other aluminum layer 523; 623; 723; 823.

As can be clearly seen in FIGS. 5 to 8, the other aluminum layer 523; 623; 723; 823 is part of the multilayer diffuser bottom 520; 620; 720; 820. In other words, the multilayer diffuser bottom 520; 620; 720; 820 also comprises the other aluminum layer 523; 623; 723; 823. As can be clearly seen in FIGS. 5 to 8, the other aluminum layer 523; 623; 723; 823 is arranged between the anisotropic graphite layer 524; 624; 724; 824 and the outer layer 525; 625; 725; 825. As can be clearly seen in FIGS. 5 to 8, the other aluminum layer 523; 623; 723; 823 is flat.

In the exemplary embodiments illustrated in FIGS. 3, 4, 7 and 8, the anisotropic graphite layer 324; 424; 724; 824 is annular.

The anisotropic graphite layer 124; 224; 324; 424; 524; 624; 724; 824 may comprise at least one perforation (not shown in the figures) passing through the thickness of the anisotropic graphite layer 124; 224; 324; 424; 524; 624; 724; 824. Preferably then, the anisotropic graphite layer 124; 224; 324; 424; 524; 624; 724; 824 may comprise multiple perforations passing through the thickness of the anisotropic graphite layer 124; 224; 324; 424; 524; 624; 724; 824.

Alternatively, the anisotropic graphite layer 124; 224; 324; 424; 524; 624; 724; 824 may be free of perforations passing through the thickness of the anisotropic graphite layer 124; 224; 324; 424; 524; 624; 724; 824.

The assembly of the cooking devices 100; 200; 300; 400 illustrated in FIGS. 1 to 4 is carried out with a production method comprising the following steps:
Providing and/or obtaining an anisotropic graphite layer 124; 224; 324; 424, an aluminum layer 121; 221; 321; 421 capable of covering the anisotropic graphite layer 124; 224; 324; 424, and a cooking support 110; 210; 310; 410 comprising a heating face 112; 212; 312; 412 having another aluminum layer 115; 215; 315; 415 capable of covering the aluminum layer 121; 221; 321; 421;
Stacking the aluminum layer 121; 221; 321; 421, the anisotropic graphite layer 124; 224; 324; 424 and the cooking support 110; 210; 310; 410, or inversely, the anisotropic graphite layer 124; 224; 324; 424 leaving an annular portion of the aluminum layer 121; 221; 321; 421 free, the heating face 112; 212; 312; 412 extending around the aluminum layer 121; 221; 321; 421;
Metallurgically assembling, by hot stamping or solid state bonding, the aluminum heating face 112; 212; 312; 412 with the aluminum layer 121; 221; 321; 421 around the anisotropic graphite layer 124; 224; 324; 424.

Thus, before the metallurgical assembly, the heating face 112; 212; 312; 412 rests on the anisotropic graphite layer 124; 224; 324; 424, or inversely.

The metallurgical assembly by hot stamping or solid state bonding of the aluminum heating face 112; 212; 312; 412 with the aluminum layer 121; 221; 321; 421 around the anisotropic graphite layer 124; 224; 324; 424 encapsulates the anisotropic graphite layer 124; 224; 324; 424 between the aluminum layer 121; 221; 321; 421 and the cooking support 110; 210; 310; 410.

The assembly of the cooking devices 500; 600; 700; 800 illustrated in FIGS. 5 to 8 is carried out with a production method comprising the following steps:
Providing and/or obtaining an anisotropic graphite layer 524; 624; 724; 824, an aluminum layer 522; 622; 722; 822 capable of covering the anisotropic graphite layer 524; 624; 724; 824, another aluminum layer 523; 623; 723; 823 capable of covering the anisotropic graphite layer 524; 624; 724; 824, and a cooking support 510; 610; 710; 810 comprising a heating face 512; 612; 712; 812 capable of covering the aluminum layer 522; 622; 722; 822;
Stacking the other aluminum layer 523; 623; 723; 823, the anisotropic graphite layer 524; 624; 724; 824, the aluminum layer 522; 622; 722; 822, and the cooking support 510; 610; 710; 810, or inversely, the anisotropic graphite layer 524; 624; 724; 824 leaving an annular portion of the aluminum layer 522; 622; 722; 822 free, the anisotropic graphite layer 524; 624; 724; 824 leaving another annular portion of the other aluminum layer 523; 623; 723; 823 free, the annular portion of the aluminum layer 522; 622; 722; 822 extending annularly with respect to the other annular portion of the other aluminum layer 523; 623; 723; 823, the heating face 512; 612; 712; 812 extending around the aluminum layer 522; 622; 722; 822;
Metallurgically assembling, by hot stamping or solid state bonding, the aluminum layer 522; 622; 722; 822 on the one hand with the heating face 512; 612; 712; 812 and on the other hand with the aluminum layer 523; 623; 723; 823 around the anisotropic graphite layer 524; 624; 724; 824.

Thus, before the metallurgical assembly, the heating face 512; 612; 712; 812 rests on the aluminum layer 522; 622; 722; 822, or inversely.

The metallurgical assembly by hot stamping or solid state bonding of the aluminum layer 522; 622; 722; 822 on the one hand with the heating face 512; 612; 712; 812 and on the other hand with the other aluminum layer 523; 623; 723; 823 around the anisotropic graphite layer 524; 624; 724; 824 encapsulates the anisotropic graphite layer 524; 624; 724; 824 between the aluminum layer 522; 622; 722; 822 and the other aluminum layer 523; 623; 723; 823, and bonds the aluminum layer 522; 622; 722; 822 to the cooking support 510; 610; 710; 810.

The multilayer diffuser bottom 120; 220; 320; 420; 520; 620; 720; 820 improves the thermal homogeneity of the cooking face 111; 311; 511; 711 of the cooking support 110; 210; 310; 410; 510; 610; 710; 810. The anisotropic graphite layer 124; 224; 324; 424; 524; 624; 724; 824 promotes the diffusion of calories in the plane of the multilayer diffuser bottom 120; 220; 320; 420; 520; 620; 720; 820, due to better thermal conductivity in the plane of said layer than in the thickness of said layer. The appearance of hot spots can therefore be delayed or prevented. The improved calorie diffusion in the multilayer diffuser bottom plane 120; 220; 320; 420; 520; 620; 720; 820 makes it possible to consider a reduction in the thickness of the multilayer diffuser bottom 120; 220; 320; 420; 520; 620; 720; 820. Using a perforated and/or annular anisotropic graphite layer 124; 224; 324; 424; 524; 624; 724; 824 improves the metallurgical bond between the aluminum layer 121; 221; 321; 421; 522; 622; 722; 822 and the other aluminum layer 115; 215; 315; 415; 523; 623; 723; 823.

If desired, the method of obtaining the cooking device 100; 200; 300; 400; 500; 600; 700; 800 may comprise a step of shaping the cooking support 110; 210; 310; 410; 510; 610; 710; 810 to obtain a cooking vessel. The cooking support shaping step 110; 210; 310; 410; 510; 610; 710; 810 may be a preliminary step prior to metallurgical assembly, for example a step of stamping the cooking support 110; 210; 310; 410; 510; 610; 710; 810. The cooking support shaping step 110; 210; 310; 410; 510; 610; 710; 810 may be a subsequent step after metallurgical assembly, for example a step of flow-forming the cooking support 110; 210; 310; 410; 510; 610; 710; 810.

Various modifications and/or improvements that are obvious for the person skilled in the art can be made to the exemplary embodiments of the invention described in this description without departing from the scope of the invention defined by the appended claims.

The invention claimed is:

1. A cooking device comprising:
a cooking support having a cooking face and a heating face;
an anisotropic graphite layer; and
a first aluminum layer; wherein the heating face comprises a second aluminum layer;
wherein the anisotropic graphite layer is encapsulated between the first aluminum layer and the second aluminum layer,
wherein the first aluminum layer and the anisotropic graphite layer comprise part of a multilayer diffuser bottom;
wherein the first aluminum layer is metallurgically assembled with the heating face, and wherein the first aluminum layer overlies only a portion of the heating face, so that another portion of the heating face surrounds said portion of the heating face and is free from contact with the first aluminum layer and the anisotropic graphite layer; and
wherein the anisotropic graphite layer is adjacent to the heating face.

2. A cooking device (comprising:
a cooking support having a cooking face and a heating face;
an anisotropic graphite layer;
a first aluminum layer; and
a second aluminum layer;
wherein the anisotropic graphite layer is encapsulated between the first aluminum layer and the second aluminum layer;
wherein the first aluminum layer, the second aluminum layer, and the anisotropic graphite layer comprise part of a multilayer diffuser bottom;
wherein the first aluminum layer is metallurgically assembled with the heating face, and wherein the first aluminum layer overlies only a portion of the heating face so that another portion of the heating face surrounds said portion of the heating face and is free from contact with the first aluminum layer and the anisotropic graphite layer; and
wherein the first aluminum layer is arranged between the heating face and the anisotropic graphite layer.

3. The cooking device according to claim 2, wherein the heating face is made of stainless steel.

4. The cooking device according to claim 1, wherein the anisotropic graphite layer is annular.

5. The cooking device according to claim 1, wherein the anisotropic graphite layer comprises at least one perforation.

6. The cooking device according to claim 1, wherein the anisotropic graphite layer is free of perforations.

7. The cooking device according to claim 1, wherein the multilayer diffuser bottom comprises an outer layer made of ferritic stainless steel.

8. The cooking device according to claim 7, wherein the outer layer forms a cup having an annular edge contacting the heating face.

9. The cooking device according to claim 1, wherein the heating face is made of stainless steel.

10. The cooking device according to claim 2, wherein the anisotropic graphite layer is annular.

11. The cooking device according to claim 2, wherein the anisotropic graphite layer comprises at least one perforation.

12. The cooking device according to claim 2, wherein the anisotropic graphite layer is free of perforations.

13. The cooking device according to claim 2, wherein the multilayer diffuser bottom comprises an outer layer made of ferritic stainless steel.

14. The cooking device according to claim 13, wherein the outer layer forms a cup having an annular edge contacting the heating face.

15. A cooking device comprising:
a cooking support having a cooking face and a heating face;
an anisotropic graphite layer; and
a first aluminum layer; wherein the heating face comprises a second aluminum layer,
wherein the anisotropic graphite layer is encapsulated between the first aluminum layer and the second aluminum layer;
wherein the first aluminum layer and the anisotropic graphite layer comprise part of a multilayer diffuser bottom;
wherein the first aluminum layer is metallurgically assembled with the heating face, and wherein the first aluminum layer overlies only a portion of the heating face, so that another portion of the heating face remains free around the first aluminum layer, wherein the first aluminum layer is not between the cooking face and the heating face; and
wherein the anisotropic graphite layer is adjacent to the heating face.

16. A method of obtaining the cooking device of claim 1 comprising:
stacking the first aluminum layer, the anisotropic graphite layer, and the cooking support, or inversely, the anisotropic graphite layer leaving an annular portion of the first aluminum layer free, the heating face extending around the first aluminum layer; and
metallurgically assembling, by hot stamping or solid state bonding, the heating face, the first aluminum layer, and the anisotropic graphite layer.

17. The method of obtaining the cooking device according to claim 16, further comprising a step of shaping the cooking support to obtain a cooking vessel.

18. The method of obtaining the cooking device according to claim 17, wherein the step of shaping the cooking support is carried out by stamping or by flow-forming.

19. A method of obtaining the cooking device of claim 2 comprising:
- stacking the second aluminum layer, the anisotropic graphite layer, the first aluminum layer, and the cooking support having the heating face configured to cover the first aluminum layer, or inversely, the anisotropic graphite layer leaving an annular portion of the first aluminum layer free, the anisotropic graphite layer leaving a second annular portion of the second aluminum layer free, the annular portion of the first aluminum layer extending annularly with respect to the second annular portion of the second aluminum layer, the heating face extending around the first aluminum layer; and
- metallurgically assembling, by hot stamping or solid state bonding, the first aluminum layer with the heating face and with the second aluminum layer around the anisotropic graphite layer.

20. The method of obtaining the cooking device according to claim 19, further comprising a step of shaping the cooking support to obtain a cooking vessel.

21. The method of obtaining the cooking device according to claim 20, wherein the step of shaping the cooking support is carried out by stamping or by flow-forming.

\* \* \* \* \*